United States Patent Office 3,510,424
Patented May 5, 1970

3,510,424
DESTRUCTION OF DISSOLVED CYANIDES
Jean-Pierre Zumbrunn, Lyon, France, assignor to L'Air Liquide Societe Anonyme pour l'Etude et l'Exploitation des Procedes George Claude
No Drawing. Filed May 24, 1968, Ser. No. 731,731
Claims priority, application France, Jan. 16, 1968, 136,088; Mar. 14, 1968, 143,792
Int. Cl. C02b 1/34
U.S. Cl. 210—63        12 Claims

ABSTRACT OF THE DISCLOSURE

A method for the treatment of effluents in which cyanides are directly converted to non-toxic and hydrolyzable cyanates, through the action of a peroxide of the inorganic or organic peroxoacid type, as the free acid or as a salt.

---

The object of this invention is a method for the treatment of industrial effluents, and more particularly for the destruction of dissolved cyanides. By this method, cyanide ions combined with various metal ions in solution are converted to non-toxic cyanates, which are later hydralyzed to carbon dioxide and nitrogen or ammonia.

Numerous methods have been suggested to destroy undesirable cyanides. Among the most frequently used, the precipitation of cyanides as insoluble iron compounds is used for small unit amounts. The method consists in adding iron sulfate to the bath to be decyanidized. This method has its disadvantages, however, the bulky precipitate requires the installation of large filters or settling tanks. On the other hand, it may be dangerous to spread the sludge, as there are risks of untimely liberation of cyanides, notably through photolysis. Besides, the elimination of the cyanides is not complete, and the effluents are highly colored.

The oxidation of cyanides to cyanates by active chlorine is at present the most popular method, although its disadvantages are far from negligible. Oxidation by chlorine, or hypochlorites gives cyanyl chloride then cyanate, and finally, but very slowly, carbon dioxide and nitrogen or ammonia.

Cyanyl chloride, which is volatile and as toxic as hydrocyanic acid, becomes dangerous when the concentration of cyanides to be destroyed becomes too high or the pH is not alkaline enough. On the other hand, the reaction is slow. There is a risk of rejection of incompletely treated wastes, containing residual free cyanides. If the reaction is speeded up by increasing the proportion of chlorine or hypochlorite, the excess remains in the effluent, which increases the salt content of the effluent and leaves free chlorine, which is deleterious to the fauna and flora of rivers.

In the case of "closed-circuit" installations, in which no continuous rejection occurs, purification over ion-exchange resins has been suggested. The regeneration of the resins then gives a highly polluted effluent, with high concentrations of various ions, which must be treated by one of the above methods.

The oxidation of cyanides to cyanates by hydrogen peroxide or ozone has also been contemplated. The latter method is too costly to compete with other methods of treatment, such as the use of hypochlorites. The former, though sound, has the disadvantage of giving a slow conversion, and requires the addition of a copper salt catalyst for rapid reaction. Copper is known to be the most reactive metal, all other cations having a lower activity or none at all. The introduction of a toxic material, the disposal of which is prohibited, restricts the interest of the method, to say nothing of the complication due to the need of metering two different reagents.

According to this invention, a method has been found which makes it possible, whatever the initial concentrations of cyanide ion and associated cations, to obtain, in most cases without adding a catalyst, effluents with a residual cyanides content below the threshold of determination.

This novel method for the treatment of effluents, in which the toxic cyanides are directly converted to non-toxic and hydrolyzable cyanates, consists in the action of a peroxoacid, either as the free acid or as a salt.

This novel method denotes an undeniable technical advance over all previous suggestions, since the addition of a powerful oxidant such as a peroxoacid is sufficient in itself to give direct, complete and fast conversion of the cyanides to cyanates without adding any catalyst.

It has been found that inorganic and organic peroxoacids characterized by the presence in their molecule of an —OOH group, readily give the required conversion, as well as the salts of such acids containing an OO$^-$ or OOH group. Thus, peroxosulfuric acid and its salts, peroxodisulfuric acid and its salts, peroxoformic acid, peroxoacetic acid or any other inorganic or organic peroxoacid may be used.

It has also been found that the free peroxoacid or its salts can be used either in the pure state or as solutions or dilutions, or even advantageously replaced by a combination of reagents capable of giving a peroxoacid.

Peroxosulfuric acid may be used under various forms, among which may be mentioned commercial solutions obtained through hydrolysis of ammonium persulfate, or through the reaction of sulfuric acid or oleum with hydrogen peroxide. The salts of this peroxoacid are suitable for carrying out the method, notably the alkali metal salts with the formula MHSO$_5$. A peroxodisulfate may be introduced to give the following reaction:

$$S_2O_8^{-2} + H_2O = SO_5^{-2} + SO_4^{-2} + 2H^+$$

Organic peroxoacids such as peroxoacetic acid may be used under various forms. Peroxoacetic acid as a 30–40% solution in acetic acid may be used, as well as combinations of reagents capable of giving the acid. Hydrogen peroxide, inorganic or organic hydroperoxidates such as peroxoborates, alkaline peroxocarbonates, peroxopyrosulfates, peroxide of urea, as well as inorganic alkali-metal and alkaline-earth-metal peroxides mixed with an organic compound from the group made up of anhydrides, acid chlorides, aldehydes, ketones, esters and amides, are particularly well suited for carrying out the method of the invention.

The amounts of peroxoacids suitable for carrying out the method are at least 1 mole peroxoacid per CN$^-$ ion-gram to be oxidized, preferably 1.1 to 7 moles.

Obviously, in cases when a very fast destruction of the cyanides is required, the excess of peroxoacid may be increased.

A study was made of the speed of destruction of the cyanides vs. e.g. the H$_2$SO$_5$/CN$^-$ ratio in the case of peroxosulfuric acid. This acid, usually called "Caro's acid," is used as a water solution containing sulfuric acid and sometimes ammonium salts, the strength of which is usually about 200 g./l. The study was made on a water solution of potassium cyanide containing 50 mg./l. CN$^-$ ion, the alkalinity of which was adjusted to 0.1 N.

H$_2$SO$_5$/CH$^-$=1.1: total destruction in 240 min.
    1.5: total destruction in 180 min.
    2.0: total destruction in 30 min.
    3.0: total destruction in 22 min.
    5.0: total destruction in 15 min.
    10.0: total destruction in 2 min.

"Total destruction" means a residual amount of CN⁻ below 0.1 mg./l.

It is not imperative that the treatment of cyanide-containing effluents be effected in a strongly alkaline medium. However, it is better to maintain a pH above 9 during the conversion of the cyanides. A pH below 9 (through the addition of the usually acidic reagent) gives a spontaneous liberation of volatile and highly toxic hydrocyanic acid.

According to a preferred embodiment of the invention, the effluent to be treated is brought to pH=9 and maintained at that value after the addition of the peroxide reagent, which is usually achieved through the reserve alkali in the solutions to be treated, or if not through renewed addition of an alkaline reagent.

Moreover, it has been found that a slight excess of OH⁻ ions made it possible to obtain a faster reaction. Thus, with a potassium cyanide solution adjusted to 50 mg./l. CN⁻ ions, treated with 2 moles peroxosulfuric acid ($H_2SO_5$ dissolved in water, from the hydrolysis of ammonium persulfate), the complete destruction of CN⁻ ions (below 0.1 mg./l.) is obtained in 50 minutes in 0.03 N caustic soda and in 20 minutes in 0.3 N caustic soda, i.e. approximately 13 g./l. NaOH.

In practice, the effluents are always highly alkaline, and in most treatments, the peroxoacid can be introduced without adjusting the pH.

The reaction rate increases when the temperature rises. As a rule, the treatment is effected at room temperature, but slightly elevated temperature is no obstacle and accelerates the conversion of the cyanides. Thus, with a solution of potassium cyanide adjusted to 50 mg./l. CN⁻ ions, and with a purposely low alkalinity to slow down the reaction, with $H_2SO_5/CN^- = 2$, the following times of reaction were obtained according to the temperature:

| Degrees C. | minutes |
| --- | --- |
| 10 | 130 |
| 20 | 50 |
| 30 | 30 |
| 40 | 15 |
| 50 | 9 |

Any cyanide-containing effluent can be treated, whatever its concentration, provided that the amount of peroxoacid is so chosen that the peroxoacid/CN⁻ ratio is 1 or more.

The new method may be applied to any cyanide-containing effluent with a concentration lying between 0.1 mg./l. and 100 mg./l. CN⁻ ions, i.e.; it is equally effective on dilute effluents and on concentrated effluents.

"Dilute effluents" usually means cyanide solutions with CN⁻ concentrations between a few mg./l. and 500 mg./l. Such effluents usually result from the rinsing of electroplated parts (copper-plating, zinc-plating or cadmium-plating) or from the dilution of metal-scouring baths, which are usually more concentrated.

"Concentrated effluents" are usually made up of alkali metal cyanides mixed with large amounts of caustic soda: they are scouring baths with a CN⁻ content between 1 g./l. and 50 g./l. They also include waste baths from the surface treatment of metals or eluates from the regeneration of ion-exchange resin purification systems.

According to existing techniques, such solutions had to be diluted to make the treatment possible or at least easier. The method of the invention has a decided advantage in the field of high cyanide contents. In the case of highly concentrated solutions, it seems better, to avoid excessive heating up, to introduce the peroxoacid in several portions, so as not to exceed about 40° C. The solutions are thus completely decyanidized with a minimum of decomposed peroxoacid.

The peroxoacids or their salts are excellent oxidants for the cyanides of metals of Group I, such as the alkali metals, copper and the noble metals, of metals of Group II, such as zinc and cadmium, and of metals of Group III, such as the metals of the nickel family, taken separately or together.

The simplified names "nickel cyanide," "copper cyanide," "zinc cyanide," "silver cyanide" etc. include all possible types of soluble binary or tertiary combinations of CN⁻ ions with alkali metal cations and cations of heavy metals, such as MeCN and $[Me(CN)_m]^{n-}$.

Mixtures of cyanides of various metals, possibly combined with solubilizing alkali metal cyanides, are readily converted, without any disadvantage or limitation, to hydrolyzable cyanates through the action of an inorganic or organic peroxoacid.

With non-alkaline cyanides, the results are equally satisfactory. The destruction is always complete and usually takes a shorter time than with alkali metal cyanides. Finally, after having reacted with the CN⁻ ion, the excess of reagent, given the conditions of dilution and pH of the medium, is rapidly converted to non-toxic $SO_4^-$ ions. Alkali metal peroxosulfates and peroxodisulfates lead to the same results.

In the course of trials, it was found that copper cyanide, known as the most readily convertible, made it possible to catalyse effectively the reaction of oxidation of cyanides which are difficult to destroy in the normal manner.

In fact, any copper salt may be used, since the mere addition of copper ions to a cyanide-containing solution induces the formation of variable amounts of a complex copper cyanide, the CN⁻ ion of which is rapidly oxidized to cyanate, freeing the $Cu^{++}$ ion, which reacts again, the catalytic cycle being repeated until the CN⁻ ions are entirely oxidized.

This is particularly evidenced in the destruction of silver cyanide, which normally requires the addition of peroxosulfuric ions in the ratio $SO_5^=/CN^- = 30$ if the oxidation is to be completed within one hour.

The addition of common copper sulfate $CuSO_4 \cdot 5H_2O$ (50 mg. per 50 mg. CN⁻) is enough to make the reaction almost instantaneous (a few seconds).

The use of organic peroxoacids is equally easy. Thus, with peroxoacetic acid, after the destruction of the CN⁻ ions, the excess reagent is rapidly converted to acetate ions, which do not alter the quality of the water.

Whatever the reagent used, the treatment of solutions of alkali metal cyanides leaves an uncolored clear effluent. In the case of the destructions of complex baths from the treatment of metals, containing e.g. zinc, cadmium, copper etc. cyanides, those cations cease to be complexed and therefore solubilized by the cyanide ions, and are precipitated as hydroxides, thanks to the alkalinity of the medium. Additional purification is thus achieved, and the effluent rejected after settling or filtering is colourless and clear and free from heavy metals. The end of the reaction can often be detected by a voltage leap between two Redox electrodes.

The method may be applied with advantage to any cyanide-containing effluent, i.e. to any solution, whether aqueous or not, already containing cyanides or capable of receiving cyanides later on. Without exceeding the scope of the invention, one may effectively introduce peroxide reagents into a solution to be decyanidized or add cyanides, whether dissolved or not, to a solution of a peroxoacid or a salt of the same, with the same results.

The following examples are illustrative and non-limitative.

EXAMPLE I

One litre of aqueous cyanide solution containing the equivalent of 5 mg. CN⁻ ions was treated at room temperature with 0.22 cc. of a 200 g./l. solution of peroxosulfuric acid, i.e. with a $H_2SO_5/CN^-$ ratio about 2. The acidity of the reagent was neutralized with 5 cc. N NaOH solution. After 30 minutes, the cyanide content was zero (below 0.1 mg./l.). The cyanide content was determined by the Aldridge and Liebig methods (The Analyst, 1958, pp. 230–241).

EXAMPLE II

One litre of alkali-metal cyanide solution, containing the equivalent of 5 mg. CN⁻ ions, was treated with 0.55 cc. of 200 g./l. peroxosulfuric acid solution, i.e. with a $H_2SO_5/CN^-$ ratio of 5, in the presence of 10 cc. N NaOH solution. After 10 minutes, no more cyanide could be detected.

EXAMPLE III

Under the same conditions as in Example I, a solution of alkali metal cyanide containing 50 mg./l. CN⁻ ions was treated with tenfold amounts of reagent. The decyanidization was as outstanding as in Example I.

EXAMPLE IV

Under the same conditions as in Example II, a solution of alkali metal cyanide containing 50 mg./l. CN⁻ ions was treated with tenfold amounts of reagent. After 10 minutes, the decyanidization was the same as in Example II.

EXAMPLE V

Under the same conditions as in Example I, a solution of alkali metal cyanide containing 500 mg./l. CN⁻ ions was treated with hundredfold amounts of reagent. Complete decyanidization was obtained within a few minutes. The temperature rose to 25° C.

EXAMPLE VI

Under the same conditions as in Example I, a solution of alkali metal cyanide containing 5 g./l. CN⁻ ions was treated with thousandfold amounts of reagent. Complete decyanidization was obtained within 20 minutes. The temperature rose to 30° C. only.

EXAMPLE VII

One litre of cyanide-containing industrial effluents from the rinsing of metal parts after electrolytic treatments, containing zinc and cadmium cyanides in amounts equivalent to 50 mg./l. CN⁻ ion, was treated with 2.2 cc. of a 200 g./l. solution of peroxosulfuric acid, i.e.

$$H_2SO_5/CN^-=2$$

No additional alkali was required, since the effluent already contained enough. The destruction was complete within a few minutes.

The metals (zinc and cadmium), which had been solubilized by the CN⁻ ions, were precipitated as the hydroxides. Additional purification of the effluent could thus be achieved through settling or filtering.

EXAMPLE VIII

One litre of industrial effluent from rinsing after scouring, containing 5 mg./l. CN⁻ ion, was treated directly with 0.22 cc. of a 200 g./l. peroxosulfuric acid solution, i.e. $H_2SO_5/CN^-=2$ approximately. After ten-twenty minutes, the solution was entirely cyanide-free.

EXAMPLE IX

One litre of industrial effluent from the regeneration of a bed of ion-exchange resin with caustic soda, containing 50 g./l. CN⁻ ion (CNNa), was treated with 400 cc. of a 35% commercial solution peroxoacetic acid, introduced in 4 fractions of 100 cc. each at 5-minute intervals. The peroxoacid/CN⁻ ratio was close to 1. Ten minutes after the last addition, no more cyanide would be detected.

EXAMPLE X

One litre of industrial alkali-metal cyanide effluent with the same origin as in Example IX, containing 10 g./l. CN⁻ ion, was treated with 120 cc. of a 35% commercial solution of peroxoacetic acid, introduced in two 60 cc. fractions with a 10-minute interval. The amount of peroxoacid added was approximately equivalent to $CH_3CO_3H/CN^-=1.5$. Ten minutes after the second addition, no more cyanide could be detected.

EXAMPLE XI

One litre of an alkali-metal cyanide solution containing 500 mg./l. CN⁻ ion was treated with 12 cc. of a 35% peroxoacetic acid solution, i.e. peroxoacid/CN⁻=3. Thirty minutes after the addition of the peroxoacid, no more cyanide could be detected.

EXAMPLE XII

One litre of an alkali-metal cyanide solution containing 500 mg./l. CN⁻ ion was treated with 8.8 g. ammonium peroxodisulfate, i.e. $S_2O_8^=/CN^-=2$. After four or five hours, the solution was cyanide-free.

EXAMPLE XIII

A series of trials was effected on alkali-metal cyanide solutions, the concentrations of which are shown in the table below, one litre of each solution being treated with commercial monopotassium peroxosulfate (40% $KHSO_5$), introduced either dry or as a freshly-prepared 10–15% water solution.

Complete decyanidization (less than 0.1 mg./CN⁻ ion) was obtained within the times shown in the table, with an initial temperature of 20° C. The pH was constantly held above 9 through addition of NaOH.

| Initial CN⁻ concentration, g./l. | Amount of KHSO₅ (40%), g./l. | KHSO₅/CN⁻ | Time to complete decyanidization |
|---|---|---|---|
| 0.005 | 0.150 | 2 | 20 minutes. |
| 0.05 | 1.5 | 2 | 10 minutes. |
| 0.5 | 15 | 2 | 3 minutes. |
| 2 | 36 | 1.2 | 2 minutes. |
| 10 | 170 | 1.2 | 1 minute. |

The above table shows that the rate of reaction increases with the concentration of the reagents, due to the rise in temperature of the reaction medium, the conversion of the cyanides to hydrolyzable cyanates under the action of a peroxide being exothermic.

EXAMPLE XIV

Industrial effluents from surface-treatment baths for metals, containing alkali-metal cyanides with large amounts of caustic soda, were treated under the conditions of Example XIII. The baths were treated as such or after dilution. In this case, the addition of alkali to hold the pH above 9 was not required, since the effluents already contained enough. The results were the same as in the previous examples.

EXAMPLE XV

The effluent of Example VII was decyanized, peroxosulfuric acid being replaced by commercial monopotassium peroxosulfate (40% $KHSO_5$) as the solid or as a freshly-prepared 10–15% water solution. The decyanidization was the same as in the above-mentioned example.

EXAMPLE XVI

One litre of a nickel cyanide solution, the concentration of which is shown in Table I, below, was treated with commercial monopotassium peroxosulfate (40% $KHSO_5$) introduced either dry or as a freshly-prepared 10–15% water solution.

Complete decyanidization (less than 0.1 mg./l. CN⁻) was obtained within the times shown in the table at room temperature. So as to avoid any evolution of volatile and toxic HCN, the pH was constantly held above 9 through addition of alkali when the effluent did not contain enough already.

TABLE I

| Initial concentration of CN⁻ (g./l.) | KHSO₅/CN⁻ | Time to complete decyanidization |
|---|---|---|
| 0.004 | 5 | Less than 10 minutes. |
| 0.04 | 5 | Do. |
| 0.4 | 5 | Do. |
| 2 | 5 | Do. |

The treated euent was colourless and cyanide-free. The nickel ions settled as an insoluble black nickel compound which was readily disposed of.

EXAMPLE XVII

The same treatments as in Example XVI were effected with the same results, but monopotassium peroxosulfate was replaced by a 200 g./l. $H_2SO_5$ solution; the $SO_5^=$/$CN^-$ ratio was preferably raised from 5 to 7.

EXAMPLE XVIII

One litre of a copper cyanide solution, the concentration of which is given in the table below, was treated under the conditions of Example XVI. Table II gives the conditions for complete decyanidization (less than 0.1 mg./l. $CN^-$) at room temperature.

In every instance, the copper ions, which ceased to be complexed by the $CN^-$ ions, precipitated as hydroxide at the end of the treatment. Peroxosulfuric acid under every form gave the same results.

TABLE II

| Initial concentration of $CN^-$ (g./l.) | $SO_5^=$/$CN^-$ | Time to complete decyanidization |
|---|---|---|
| 0.0035 | 1.1 | 10–15 minutes. |
|  | 1.3 | 10–20 seconds. |
| 0.035 | 1.1 | 10–15 minutes. |
|  | 1.3 | 10–20 seconds. |
| 0.35 | 1.1 | 10–15 minutes. |
|  | 1.3 | 10–20 seconds. |

EXAMPLE XIX

Copper-cyanide containing wastes were decyanidized with commercial solutions of peroxoacetic acid.

The results were the same as in Example XIII for $CH_3CO_3H$/$CN^-$=1.1 and 1.3.

EXAMPLE XX

Zinc-cyanide containing wastes were decyanidized with peroxosulfuric or monopotassium peroxosulfate under the conditions of the previous exmaples.

The results are summarized in the following table.

TABLE III

| Initial $CN^-$ concentration | $SO_5^=$/$CN^-$ | Time to Complete decyanidization |
|---|---|---|
| 0.005 | 2 | 10 minutes. |
|  | 3 | 2 minutes. |
|  | 4 | A few seconds. |
| 0.05 | 1.3 | 2 minutes. |
| 0.5 | 1.3 | 1 minute. |

Zinc hydroxide precipitated at the end of the reaction. It was readily separated.

EXAMPLE XXI

Sodium-cyanide containing wastes were decyanidized under the conditions of Example XX. The results were the same.

EXAMPLE XXII

One litre of effluent containing silver cyanide (0.050 g./l. $CN^-$) was treated with peroxosulfuric acid or wtih monopotassium peroxosulfate under the conditions of Examples XV and XVII. After 60 minutes, decyanidization was complete. The same result was obtained in a few seconds in the presence of a 12.5 mg. copper as $$CuSO_4 \cdot 5H_2O$$

What I claim is:
1. A method for the treatment of effluents containing dissolved cyanides for the destruction of said dissolved cyanides in order to convert directly said toxic cyanides to non-toxic and hydrolysable cyanates, which comprises adding a peroxoacid compound selected from peroxoacids having an —OOH group and salts of peroxoacids having a —OOH or an OO⁻ group, to said effluents, said peroxoacid compound reacting with said dissolved cyanides to yield non-toxic cyanates.

2. A method according to claim 1 in which the peroxoacid is a free inorganic peroxoacid or salt thereof.

3. A method according to claim 1 in which the peroxoacid is a free organic peroxoacid or salt thereof.

4. A method according to claim 1 in which the peroxoacid is a member of the group consisting of peroxosulfuric acid and its salts, peroxoformic acid and its salts and peroxoacetic acid and its salts.

5. A method according to claim 1 in which a combination of reagents capable of giving a peroxoacid is introduced into the effluent.

6. A method according to claim 5 in which the combination of reagents consists in a compound giving reactive oxygen and an inorganic acid or an organic compound belonging to the group consisting of anhydrides, acid chlorides, aldehydes, esters and amides.

7. A method according to claim 6 in which the compound giving reactive oxygen is a member of the group consisting of hydrogen peroxide, inorganic and organic hydroperoxidates such as alkali-metal peroxoborates and peroxocarbonates, peroxopyrophosphates, peroxide of urea and alkali-metal and alkaline-earth-metal peroxides.

8. A method according to claim 1 in which the amount of peroxoacid used is at least 1 mole per ion-gram $CN^-$ to be oxidized.

9. A method according to claim 8 in which the amount of peroxoacid used is 1.1 to 7 moles per ion-gram $CN^-$ to be oxidized.

10. A method according to claim 8 in which the treatment of the effluent is effected at a pH above 9 and at temperatures between room temperature and 40° C.

11. A method according to claim 1 in which the $CN^-$ concentration of the effluent to be treated lies between 0.1 mg./l. and 100 g./l.

12. A method according to claim 1 in which the treatment of cyanides which are difficult to oxidize is effected in the presence of a copper salt.

References Cited

UNITED STATES PATENTS 2,311,314   2/1943   Reichert et al. _____ 210—50

OTHER REFERENCES

Gurnham, C. F., Principles of Industrial Waste Treatment, 1955, John Wiley & Sons, N.Y., p. 220 relied on.

MICHAEL E. ROGERS, Primary Examiner

U.S. Cl. X.R.

23—84

PO-1050
(5/69)

UNITED STATES PATENT OFFICE
CERTIFICATE OF CORRECTION

Patent No. 3,510,424      Dated May 5, 1970

Inventor(s) Jean-Pierre ZUMBRUNN

It is certified that error appears in the above-identified patent and that said Letters Patent are hereby corrected as shown below:

In the Specification

Column 2, line 66, "CH-" should be ---CN- ---

Signed and sealed this 6th day of July 1971.

(SEAL)
Attest:

EDWARD M. FLETCHER, JR.          WILLIAM E. SCHUYLER, JR.
Attesting Officer               Commissioner of Patents